F. F. Fowler,
Derrick,
No. 1,869, Reissued Feb. 14, 1865.
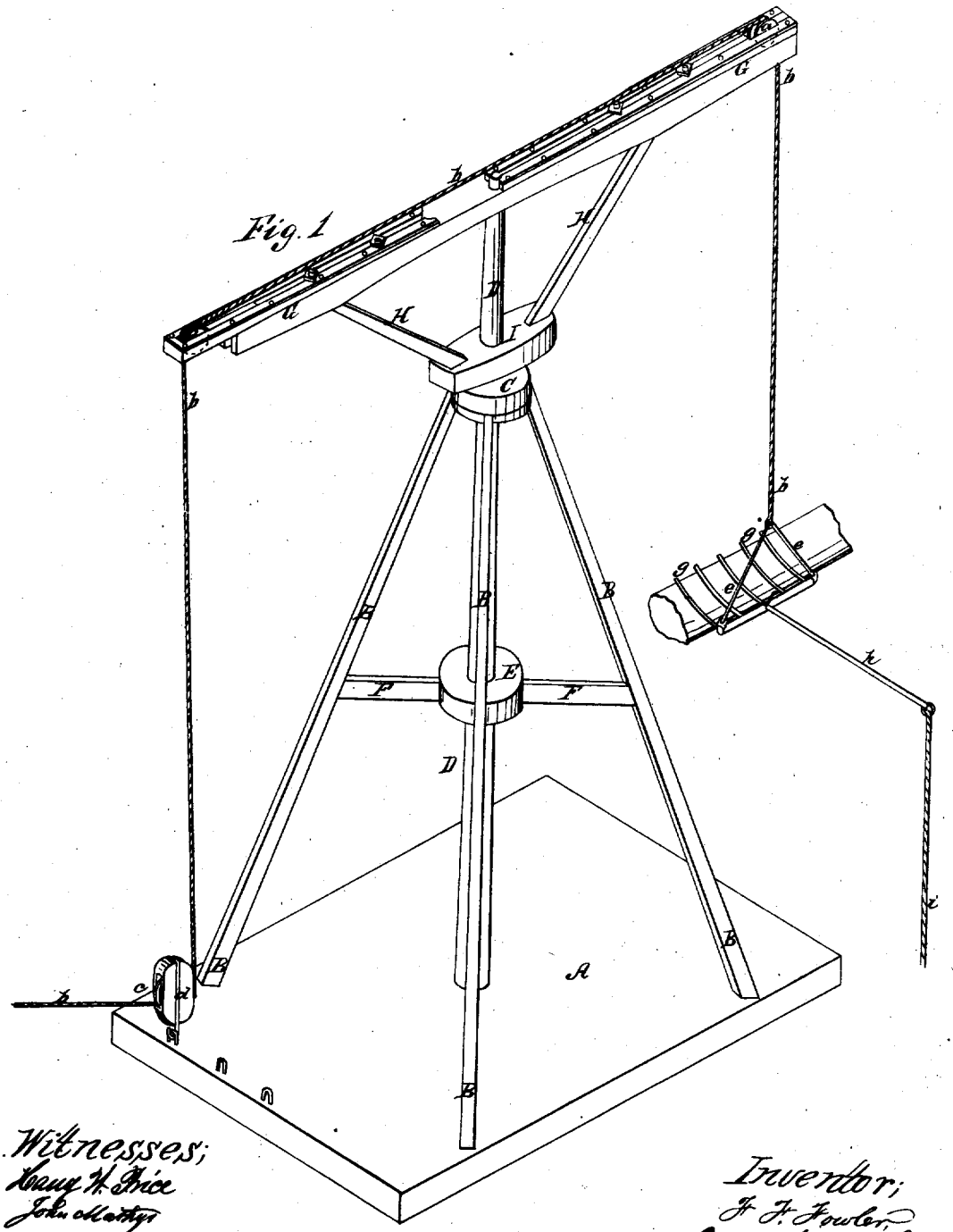
Witnesses;
Henry H. Price
John Martyn
Inventor;
F. F. Fowler,
By atty N. B. Stoughton
AM. PHOTO-LITHO. CO. N.Y. (OSBORNE'S PROCESS)

UNITED STATES PATENT OFFICE.

F. F. FOWLER, OF CRANE TOWNSHIP, OHIO.

IMPROVEMENT IN HAY-ELEVATORS.

Specification forming part of Letters Patent No. 27,899, dated April 17, 1860; Reissue No. 1,341, dated September 9, 1862; Reissue No. 1,869, dated February 14, 1865.

DIVISION NO. 1.

*To all whom it may concern:*

Be it known that I, F. F. FOWLER, of Crane township, county of Wyandotte, State of Ohio, have invented certain new and useful Improvements in Elevating Hay or other Similar Products; and I do hereby declare that the following is a full, clear, and exact description of that part of my invention relating to Division No. 1, reference being had to the accompanying drawing, making a part of this specification, in which—

Figure 1 represents a perspective view of the machine in use.

To make a hay-elevator so simple and perfect as to become a regular agricultural implement requires much skill and invention. In the first place, it must be cheap and simple, and, secondly, it must be portable, easily placed, and staunch to endure the work, without the use of guys or stays that have to be set, arranged, or fastened; and, thirdly, the base of the elevator must not be so broad or long as to interfere with its being brought up close to its work.

The object of my invention is to embrace all these desirable qualities in one apparatus, and this I believe I have effectually done.

My invention consists, first, in the combination of the permanent pyramidal supporting-frame and the revolving or turning cross-bar and its braces with a central supporting-piece for steadying and allowing said cross-bar and its braces to turn freely upon the supporting-frame.

It further consists in combining with said cross-bar, revolving upon an under supporting-frame, the so arranging of the hoisting-tackle that the weight to be raised shall be upon one end of the cross-bar, while the power to raise it is applied to the opposite end of this bar, so that a small structure may be used that can be conveniently transported or moved, that will occupy but little space, and that will be sufficiently staunch without the addition of guys or braces which require fastening or adjusting.

It further consists in the construction of elevators for hay, of two pyramidal frames, one placed upon the other, the under frame being upright, and the upper one inverted, the apices of both so united that the upper frame may freely turn upon while it is supported by the lower frame.

To enable others skilled in the art to make and use my invention, I will describe its construction and operation.

If the base A of the elevator could be made large enough, the structure would stand without liability to topple over; or if guys or extra braces were used the structure could be made rigid by them, but a large base prevents the machine from being rapidly and closely moved up to its work, and also prevents the hay from being brought up close to the machine, so that that feature is quite objectionable. To use extra guys or braces from the top of the structure would not only interfere with the free turning of the cross-bar, but the trouble of fastening and unfastening them every time the structure had to be moved would prevent the general use of the machine To get, therefore, a small base, and obviate the use of guys or braces, I so rig the hoisting-tackle as to make it subserve the purpose of guys or braces, and so equalize the load upon the structure as to make it abundantly rigid without any other support than its permanent support on the base A. From the base A rise braces B, which point to a common center, their upper ends being fastened into or secured to a head-block, C, and a post, D, centrally placed between the braces, may rise up to or through said head-block, which post may be additionally braced, as at E F. These pieces B, C, D, E, and F together form a pyramidal frame supported by and resting upon the base A.

G is a cross-bar, projecting both ways from the central support or post, D, and sufficiently far to admit the hay being easily caught upon the fork and raised up or transferred to the stack. From this cross-bar braces H H incline inward to and are secured to a head-block, I, that rests upon the head-block C, or upon a shoulder formed upon the central support, D, or partially upon both, but so that the cross-bar and its braces may freely turn thereon when necessary to do so. The pieces G H H, and I form a second pyramidal frame, but inverted, and its apex I rests upon or is so connected with the apex C of the lower pyramidal frame, through the central support, D, as to allow the upper frame to freely turn on while it is supported and guided by the lower frame. Sheaves *a a* are placed in or on the ends of the cross bar G, over which the rope *b* is reefed, one end of said rope passing around a sheave, *c*, in a block, *d*, that is hooked to the base A at any convenient point, and to this end of the rope the team or power to raise the hay and turn the same around is connected or attached. The other end of the rope *b* is connected by chains or ropes *e* to a fork, *f*, having a series of prongs or teeth, *g*, slightly curved, upon which the hay to be elevated is supported. To the handle *h* of the fork a line, *i*, is attached, which the attendant holds in his hands, under suitable restraint, until the hay is to be dropped from the fork, when he releases or lets go the line *i*, and the fork will then draw out of the hay or other thing being stacked or housed.

By thus suspending the weight to be raised at one end of the cross-bar, and applying the power to raise that weight at the opposite end of this cross-bar, the tendency of either to topple over the hoisting apparatus is counteracted by the other, the weight and the power being about equal. Any tendency of the cross-bar G to overbalance is taken by the brace on that side to the head-block I, or to the central supporting-post, where it is counteracted, and thus by a comparatively small base, and without fastening the apparatus to the ground by guys, braces, or anchors, it is sufficiently rigid and firm to resist any overturning, while from its lightness and portability it is with ease moved from place to place as may be required. The strength of the under frame is concentrated in its head-block or apex C. The tendency of the cross-beam G to overbalance is sustained by its head-block or apex I, and thus both the strength and the strain come upon each other at a central point, where it is easily poised or disseminated.

The machine may be mounted on wheels or runners for the purpose of easily moving it from one place to another, and two or more stacks may be built without changing its position, as the cross-beam can be swung around a full circle and take up and deliver the hay at any point within its circuit of motion.

Having thus fully described the nature and object of my invention, what I claim as new, and desire to secure by Letters Patent, is—

1. In the construction of elevators for hay, the combination of the permanent pyramidal supporting-frame and the revolving cross-bar and its braces with a central supporting-piece for allowing the cross-bar and its braces to turn upon the supporting-frame, substantially in the manner and for the purposes described.

2. In the construction of elevators for hay, in combination with the cross-bar revolving upon an under supporting-frame, the so arranging of the sheaves and hoisting-tackle that the weight to be raised shall be upon one end of the cross-bar while the power to raise that weight is applied to the opposite end of the cross-bar, for the purpose of enabling me to use a small and compact structure that may be easily transported or moved, occupying but little space, and sufficiently rigid within itself without the use of additional guys, braces, or other fastenings, as herein described.

3. In the construction of elevators for hay, two pyramidal frames, one placed upon the other, the under frame being upright and the upper one inverted, and the head-blocks or apices of both so united as that the upper frame may freely turn upon while it is supported by the lower frame, substantially as described.

In presence of— F. F. FOWLER.
W. H. KIRBY,
A. W. BRINKERHOFF.